US012316181B2

(12) United States Patent
Osugi

(10) Patent No.: US 12,316,181 B2
(45) Date of Patent: May 27, 2025

(54) STATOR FOR ROTARY ELECTRIC MACHINE

(71) Applicant: TOYOTA JIDOSHA KABUSHIKI KAISHA, Aichi-ken (JP)

(72) Inventor: Ryosuke Osugi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 247 days.

(21) Appl. No.: 18/170,544

(22) Filed: Feb. 17, 2023

(65) Prior Publication Data
US 2023/0268791 A1    Aug. 24, 2023

(30) Foreign Application Priority Data

Feb. 18, 2022    (JP) .................. 2022-024254

(51) Int. Cl.
*H02K 3/48*    (2006.01)
*H02K 1/16*    (2006.01)

(52) U.S. Cl.
CPC ............... *H02K 3/48* (2013.01); *H02K 1/16* (2013.01)

(58) Field of Classification Search
CPC ...... H02K 3/50; H02K 3/505; H02K 15/0056; H02K 15/0068; H02K 3/46
See application file for complete search history.

(56) References Cited

U.S. PATENT DOCUMENTS

| 2001/0026102 | A1* | 10/2001 | Asao ................. | H02K 9/06 |
| | | | | 310/59 |
| 2017/0271937 | A1 | 9/2017 | Takei | |
| 2020/0021170 | A1* | 1/2020 | Nakayama ......... | H02K 15/35 |
| 2021/0344244 | A1* | 11/2021 | Koshiba .............. | H02K 3/28 |
| 2021/0408856 | A1* | 12/2021 | Fukunaga ........... | H02K 1/16 |
| 2022/0134479 | A1* | 5/2022 | Ryan .................. | H01R 4/029 |
| | | | | 219/121.64 |
| 2022/0416605 | A1* | 12/2022 | Hisada ............... | H02K 3/28 |

FOREIGN PATENT DOCUMENTS

| JP | 2015-19539 | A | | 1/2015 | |
| JP | 2017-169392 | A | | 9/2017 | |
| JP | 2018-098919 | A | | 6/2018 | |
| JP | 2021-97539 | A | | 6/2021 | |
| WO | WO-2020013326 | A1 | * | 1/2020 | ......... H02K 1/16 |
| WO | WO-2020031612 | A1 | * | 2/2020 | ......... H02K 3/50 |

* cited by examiner

*Primary Examiner* — Michael Andrews
*Assistant Examiner* — Nicholas Lee Setzer
(74) *Attorney, Agent, or Firm* — HAUPTMAN HAM, LLP

(57) ABSTRACT

A stator for a rotary electric machine. The stator includes: a tubular stator core and a coil including coil segments inserted in slots of the stator core. The coil segments include segment end portions outwardly protruding from an axial end face of the stator core. The coil includes welded portions each of which is constituted by the segment end portions that are welded to each other. The welded portions include a plurality of kinds of welded portions that are different from each other in a welded manner in which the segment end portions are welded to each other, such that the plurality of kinds of welded portions are arranged in circumferential direction of the stator core and/or in a radial direction of the stator core.

4 Claims, 7 Drawing Sheets

STATOR FOR ROTARY ELECTRIC MACHINE

This application claims priority from Japanese Patent Application No. 2022-024254 filed on Feb. 18, 2022, the disclosure of which is herein incorporated by reference in its entirety.

FIELD OF THE INVENTION

The present invention relates to a stator for a rotary electric machine, wherein a coil is bent in a circumferential direction of a stator core and is welded, outside an axial end face of the stator core.

BACKGROUND OF THE INVENTION

There is known a stator for a rotary electric machine, wherein a coil is bent in a circumferential direction of a stator core and is welded, outside an axial end face of the stator core. For example, JP-2015-19539A discloses such a stator for a rotary electric machine.

SUMMARY OF THE INVENTION

However, in the stator for the rotary electric machine disclosed in the above-identified Japanese Patent Application publication, an annular rigidity of the coil is uniform so that an annular rigidity of the stator is also uniform thereby resulting in risk of generation of resonance in the stator.

The present invention was made in view of the background art described above. It is therefore an object of the present invention to provide a stator for a rotary electric machine, wherein the stator is capable of suppressing resonance of the stator, by making an annular rigidity of a coil not uniform.

The object indicated above is achieved according to the following aspects of the present invention.

According to a first aspect of the invention, there is provided a stator for a rotary electric machine. The stator includes: a tubular stator core; and a coil including coil segments inserted in slots of the stator core. The coil segments include segment end portions outwardly protruding from an axial end face of the stator core. The coil includes welded portions each of which is constituted by the segment end portions that are welded to each other. The welded portions include a plurality of kinds of welded portions that are different from each other in a welded manner in which the segment end portions are welded to each other, such that the plurality of kinds of welded portions are arranged in at least one of a circumferential direction of the stator core and a radial direction of the stator core.

According to a second aspect of the invention, in the stator according to the first aspect of the invention, the plurality of kinds of welded portions are different from each other in at least one of (i) a position in which the segment end portions are welded to each other and (ii) a dimension over which the segment end portions are welded to each other.

According to a third aspect of the invention, in the stator according to the first or second aspect of the invention, the plurality of kinds of welded portions are arranged in the circumferential direction of the stator core, wherein each pair of the welded portions, which are adjacent to each other in the circumferential direction, consist of two of the kinds of welded portions, which are different from each other in the welded manner.

According to a fourth aspect of the invention, in the stator according to any one of the first through third aspects of the invention, the plurality of kinds of welded portions are arranged in the radial direction of the stator core, wherein each pair of the welded portions, which are adjacent to each other in the radial direction, consist of two of the kinds of welded portions, which are different from each other in the welded manner.

According to a fifth aspect of the invention, in the stator according to any one of the first through fourth aspects of the invention, the plurality of kinds of welded portions are arranged in the circumferential direction of the stator core, wherein each pair of the welded portions, which are located in respective positions symmetrical to each other with respect to an axis of the tubular stator core, consist of two of the kinds of welded portions, which are different from each other in the welded manner.

In the stator according to the first aspect of the invention, the coil segments include the segment end portions outwardly protruding from the axial end face of the stator core, wherein the coil includes the welded portions each of which is constituted by the segment end portions that are welded to each other, and wherein the welded portions include the plurality of kinds of welded portions that are different from each other in the welded manner in which the segment end portions are welded to each other, such that the plurality of kinds of welded portions are arranged in the circumferential direction of the stator core and/or the radial direction of the stator core. Thus, the welded portions include the plurality of kinds of welded portions that are different from each other in the welded manner, wherein the plurality of kinds of welded portions are arranged in the circumferential direction of the stator core and/or the radial direction of the stator core. Owing to this arrangement, an annular rigidity of the coil is not uniform, in contrast with an arrangement in which the welded portions consist of the same kind of welded portions. Since the annular rigidity of the coil is not uniform, an annular rigidity of the stator is also not uniform so that it is possible to suppress resonance of the stator.

In the stator according to the second aspect of the invention, the plurality of kinds of welded portions are different from each other in at least one of (i) the position in which the segment end portions are welded to each other and (ii) the dimension over which the segment end portions are welded to each other. In this arrangement in which the plurality of kinds of welded portions are different from each other in the above-described position and/or the above-described dimension, the plurality of kinds of welded portions are different from each other in rigidity, namely, the coil segments are different from each other in rigidity. Owing to this arrangement, the annular rigidity of the coil is not uniform, in contrast with an arrangement in which the plurality of kinds of welded portions are not different from each other in the above-described position and/or the above-described dimension. Since the annular rigidity of the coil is not uniform, the annular rigidity of the stator is also not uniform so that it is possible to suppress the resonance of the stator.

In the stator according to the third aspect of the invention, the plurality of kinds of welded portions are arranged in the circumferential direction of the stator core, wherein each pair of the welded portions, which are adjacent to each other in the circumferential direction, consist of two of the kinds of welded portions, which are different from each other in the welded manner. Owing to this arrangement, the annular rigidity of the coil is not uniform in the circumferential direction, in contrast with an arrangement in which each circumferentially adjacent pair of the welded portions do not consist of two of the kinds of welded portions. Since the annular rigidity of the coil is not uniform, the annular rigidity of the stator is also not uniform so that it is possible to suppress the resonance of the stator.

In the stator according to the fourth aspect of the invention, the plurality of kinds of welded portions are arranged in the radial direction of the stator core, wherein each pair of the welded portions, which are adjacent to each other in the radial direction, consist of two of the kinds of welded portions, which are different from each other in the welded manner. Owing to this arrangement, the annular rigidity of the coil is not uniform in the radial direction, in contrast with an arrangement in which each radially adjacent pair of the welded portions do not consist of two of the kinds of welded portions. Since the annular rigidity of the coil is not uniform, the annular rigidity of the stator is also not uniform so that it is possible to suppress the resonance of the stator.

In the stator according to the fifth aspect of the invention, the plurality of kinds of welded portions are arranged in the circumferential direction of the stator core, wherein each pair of the welded portions, which are located in respective positions symmetrical to each other with respect to the axis of the tubular stator core, consist of two of the kinds of welded portions, which are different from each other in the welded manner. Owing to this arrangement, the annular rigidity of the coil is not uniform between the positions symmetrical to each other with respect to the axis, in contrast with an arrangement in which each pair of the welded portions, which are located in the respective positions symmetrical to each other with respect to the axis, do not consist of two of the kinds of welded portions. Since the annular rigidity of the coil is not uniform, the annular rigidity of the stator is also not uniform so that it is possible to suppress the resonance of the stator.

DETAILED DESCRIPTION OF PREFERRED EMBODIMENTS

There will be described embodiments of the present invention in details with reference to drawings. It is noted that figures of the drawings are simplified or deformed as needed, and each portion is not necessarily precisely depicted in terms of dimension ratio, shape, angle, etc, for easier understanding of each of the embodiments. Further, in the description of second and third embodiments of the invention, there will be described mainly elements different from those of the first embodiment. The same reference signs as used in the first embodiment will be used in the description of the second and third embodiments, to identify the functionally corresponding elements, and descriptions thereof are not provided.

First Embodiment

Figure 1:
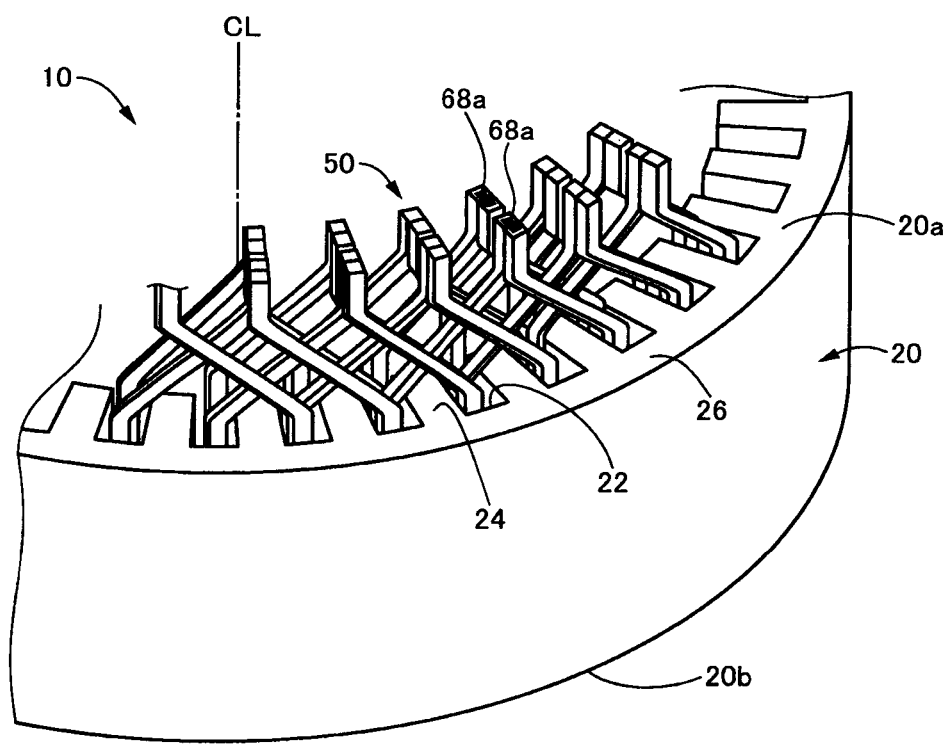
FIG. 1 is a perspective view schematically showing a construction of a stator for a rotary electric machine, wherein the stator is constructed according to a first embodiment of the present invention.

FIG. 1 is a perspective view schematically showing a construction of a stator 10 for a rotary electric machine MG, wherein the stator 10 is constructed according to a first embodiment of the present invention. In FIG. 1, an insulation film, which is provided to cover each of coil segments 60 (see FIGS. 2 and 3) of a coil 50, is not illustrated. In FIG. 1, an axis CL is represented by a line extending in a vertical direction in the drawing sheet. However, the axis CL extends in a horizontal direction, for example, in a state in which the rotary electric machine MG is installed in a vehicle. It is noted that the horizontal direction in which the axis CL extends in this state does not have to be a strictly horizontal direction but may be inclined with respect to the strictly horizontal direction. That is, the axis CL does not necessarily have to extend in the strictly horizontal direction, as long as the axis CL extends in a direction including a component parallel to the strictly horizontal direction.

The rotary electric machine MG is to be installed in a hybrid electric vehicle or an electric vehicle, and is a so-called motor generator having a function serving as an electric motor and a function serving as an electric power generator. The rotary electric machine MG is a drive power source for driving the vehicle. The rotary electric machine MG includes the above-described stator 10 extending in a direction of the axis CL and a rotor (not shown) provided on an inner peripheral side of the stator 10. The rotor is to be rotated by a rotating magnetic field generated by the stator 10.

The stator 10 includes a stator core 20 and a coil 50. In an example shown in FIG. 1, the coil 50 is wound in a distributed winding in which the coil 50 is wound across a plurality of slots 22. The stator core 20 has a cylindrical body whose center lies on the axis CL, and is constituted by a plurality of electromagnetic steel plates that are laminated on each other. Although it is preferable that the stator core 20 has a cylindrical shape, a cross sectional shape of the stator core 20 does not necessarily have to be a circular shape, as long as the stator core 20 has a tubular shape. The core 50 has an annular body whose center lies on the axis CL as the stator core 20. In the following description, "direction parallel to the axis CL", "circumferential direction of the stator core 20" and "radial direction of the stator core 20" will be simply referred to as "direction of the axis CL", "circumferential direction" and "radial direction", respectively. In an inner circumferential surface of the tubular stator core 20, there are provided a plurality of groove portions, i.e., the slots 22 that are located at equal angular intervals around the axis CL. Each of the slots 22 has a predetermined depth in the radial direction toward an outer peripheral side of the stator 10, and extends throughout the tubular stator core 20 in the direction of the axis CL. Each of the slots 22 is defined between a corresponding circumferentially adjacent pair of tooth portions 24 that are also located at equal angular intervals around the axis CL. As described below, the coil segments 60 are inserted in the slots 22 (see FIGS. 2 and 3) such that each of the coil segments 60 is connected to a corresponding one of the coil segments 60 and such that the coil 50 is wound on the tooth portions 24. The stator core 20 includes a yoke portion 26 that is other than the tooth portions 24. The yoke portion 26 serves as a path of magnetic field lines between the tooth portions 24 that serve as electromagnetics. It is noted that the stator core 20 does not necessarily have to be constituted by a plurality of electromagnetic steel plates that are laminated on each other, but may be formed by molding electromagnetic powder, solid or the like. The coil 50 is a three-phase coil for U-phase, V-phase and W-phase, for example.

Figure 2:
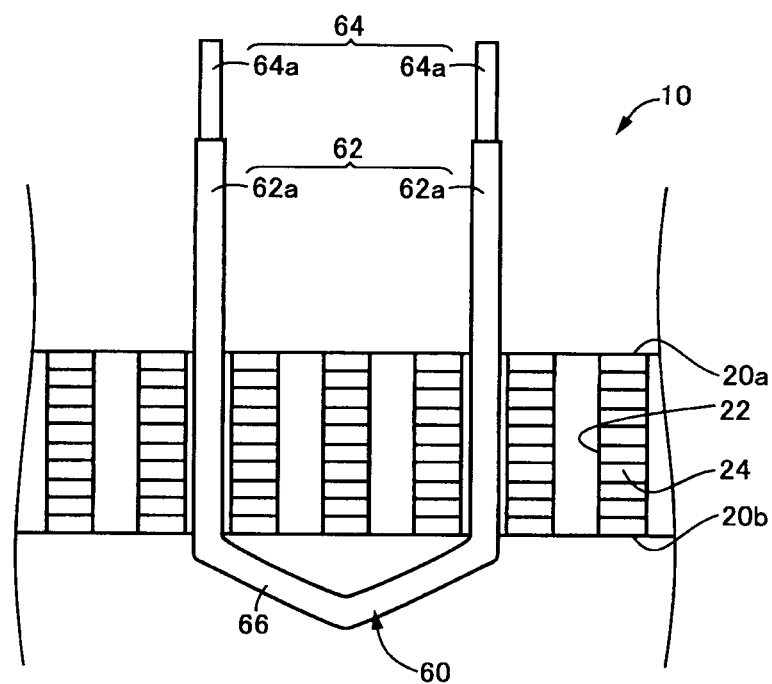
FIG. 2 is a view for explaining a process of winding a coil on a stator core shown in FIG. 1, wherein the view is a development view of an inner circumferential surface of the stator core and shows a state in which a coil segment is inserted in slots.
Figure 3:
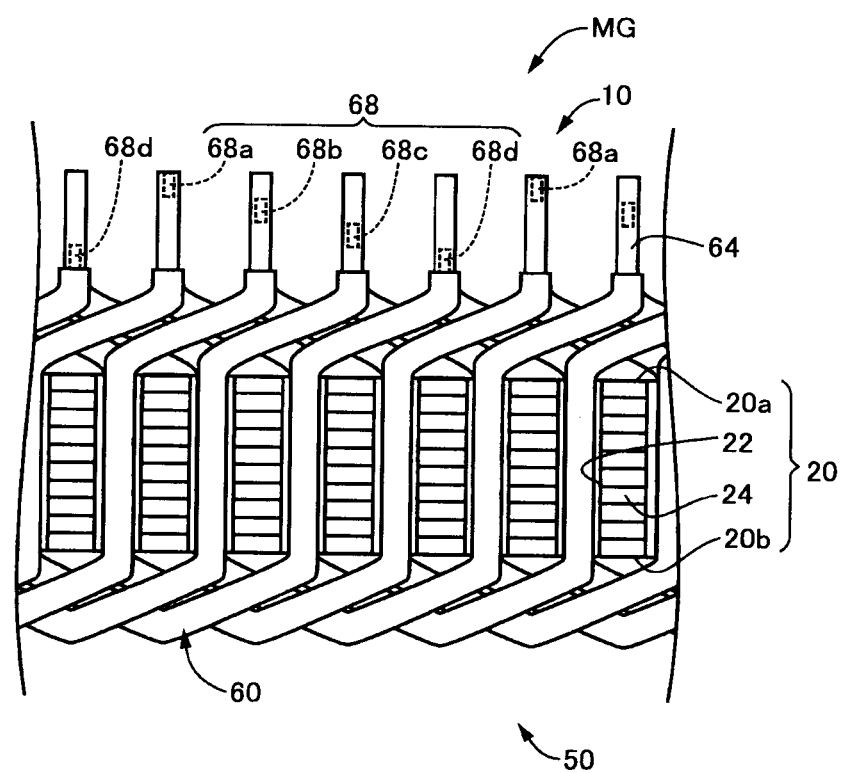
FIG. 3 is a view for explaining the process of winding the coil on the stator core shown in FIG. 1, wherein the view is a development view of the inner circumferential surface of the stator core and shows a state in which the coil segments are connected by welding.

FIG. 2 is a view for explaining a process of winding the coil 50 on the stator core 20 shown in FIG. 1, wherein the view is a development view of an inner circumferential surface of the stator core 20 and shows one of the coil segments 60 inserted in the slots 22. FIG. 3 is a view for explaining the process of winding the coil 50 on the stator core 20 shown in FIG. 1, wherein the view is a development view of the inner circumferential surface of the stator core 20 and shows a state in which the coil segments 60 are connected by welding.

Each of the coil segments 60 inserted in the slots 22 is constituted by, for example, a so-called rectangular conductor, i.e., an elongated conductor plate having a rectangular cross-sectional shape, such that an insulation film made of enamel or the like is provided to cover a surface of the rectangular conductor. Each of the coil segments 60 is bent to have a substantially U shape, and includes a first arm portion 62a, a second arm portion 62b and a connection portion 66. The first and second arm portions 62a, 62b straightly extend in substantially the same direction. The connection portion 66 connects between proximal end portions of the respective first and second arm portions 62a, 62b. The first and second arm portions 62a, 62b have respective distal end portions 64a, 64b that are not covered with the insulation film. It is noted that the distal end portions 64a, 64b corresponds to "segment end portions" recited in the appended claims. In the following description, the first and second arm portions 62a, 62b will be simply referred to as "arm portions 62", and the distal end portions 64a, 64b will be simply referred to as "distal end portions 64", unless they are to be distinguished from each other.

As shown in FIG. 2, firstly, the arm portions 62 of each of the coil segments 60 are inserted into the respective slots 22, such that the distal end portions 64 of the respective arm portions 62 of each of the coil segments 60 protrude from an axial end face 20a of the stator core 20. With the arm portions 62 of each of the coil segments 60 being inserted in the respective slots 22, the connection portion 66 of each of the coil segments 60 is in contact with another axial end face 20b of the stator core 20. FIG. 2 shows representatively one of the inserted coil segments 60. In each of the slots 22, a corresponding plurality of the arm portions 62 of the coil segments 60 (corresponding four of the arm portions 62 in the present embodiment), which are arranged in the radial direction, are inserted.

Next, as shown in FIG. 3, the distal end portions 64 of each of the coil segments 60, which protrude from the axial end face 20a of the stator core 20, are bent in the circumferential direction of the stator core 20. Then, one of the distal end portions 64 of each of the coil segments 60 is welded to one of the distal end portions 64 of another one of the coil segments 60, for example, by TIG (Tungsten Inert Gas) welding, so as to cooperate with each other to constitute a welded portion 68. Thus, the plurality of coil segments 60 are electrically connected at the welded portions 68 to one another, whereby the coil 50 are wound on the tooth portions 24.

As shown in FIG. 3, the plurality of welded portions 68 include a plurality of kinds of welded portions 68 that are different from each other in terms of a distance of a welded position (i.e., position in which the distal end portions 64 are welded to each other) from the axial end face 20a in the direction of the axis CL. In the present embodiment, the plurality of kinds of welded portions 68 consist of first, second, third and fourth welded portions 68a, 68b, 68c, 68d. In the following description, the first, second, third and fourth welded portions 68a, 68b, 68c, 68d will be simply referred to as "welded portions 68", unless they are to be distinguished from each other. The first, second, third and fourth welded portions 68a, 68b, 68c, 68d are arranged every four in the circumferential direction, namely, each adjacent four of the welded portions 68 which are adjacent to one another in the circumferential direction consist of the first, second, third and fourth welded portions 68a, 68b, 68c, 68d, such that each pair of the welded portions 68, which are adjacent to each other in the circumferential direction, consist of two of the kinds of welded portions 68. The welded position can be changed, for example, by changing an applied part of the distal end portion 64 to which an arc is applied from an electrode rod in the TIG welding. Since the coil 50 is constituted by the coil segments 60 that are connected to one another at the plurality of kinds of welded portions 68a, 68b, 68c, 68d which are different from one other in rigidity and which are arranged in the circumferential direction, a rigidity (hereinafter will be referred to as "annular rigidity") of the coil 50 having an annular shape varies in the circumferential direction, namely, is not uniform in the circumferential direction. It is noted that the welded position corresponds to "welded manner (in which the segment end portions are welded to each other)" and "position (in which the segment end portions are welded to each other)", which are recited in the appended claims.

Each of FIGS. 2 and 3 is the view for conceptually explaining the process of winding the coil 50. In the present embodiment, for example, the plurality of coil segments 60, which are substantially identical in shape with one another, are inserted in the slots 22 while being combined with one another to cooperate to have an annular shape, and are welded to one another to form the annular coil 50. The coil 50 is pressed against both of the axial end faces 20a, 20b of the stator core 20. Therefore, the annular rigidity of the stator 10 is affected by the annular rigidity of the coil 50 as well as the annular rigidity of the stator core 20.

Figure 4:
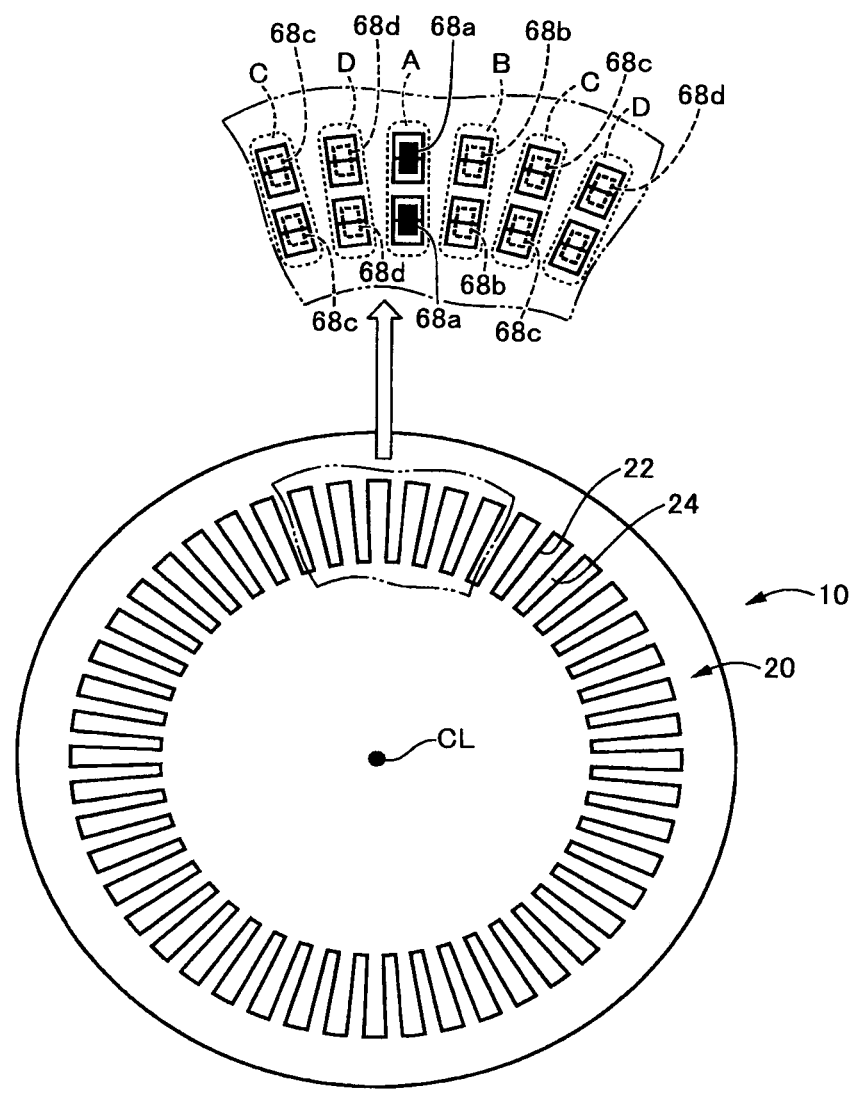
FIG. 4 is a schematic view of arrangement of a plurality of welded portions of the coil wound on the stator core shown in FIG. 1, as viewed in an axial direction of the stator core.

FIG. 4 is a schematic view of arrangement of the plurality of welded portions 68 of the coil 50 wound on the stator core 20 shown in FIG. 1, as viewed in the direction of the axis CL.

In the circumferential direction, regions A, B, C, D are regularly arranged every four. That is, each adjacent four regions which are adjacent to one another in the circumferential direction consist of the regions A, B, C, D. The welded portions 68 located in the respective regions A, B, C, D are first, second, third and four welded portions 68a, 68b, 68c, 68d, respectively. The two welded portions 68 located in each of the regions A, B, C, D are different from each other in position in the radial direction.

Figure 5:
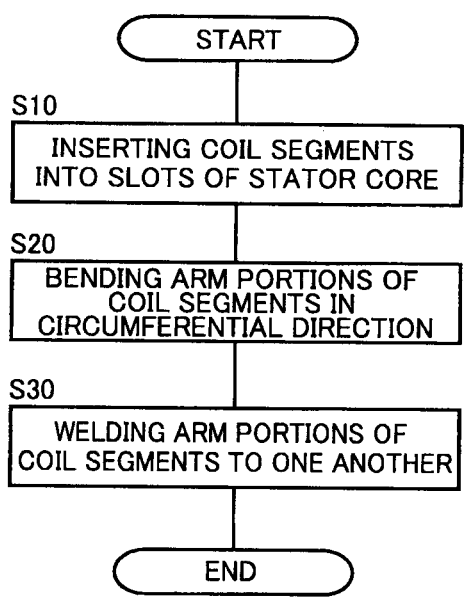
FIG. 5 is a view for explaining steps of the process of winding the coil on tooth portions of the stator core shown in FIG. 1.

FIG. 5 is a view for explaining steps of the process of winding the coil 50 on the tooth portions 24 of the stator core 20 shown in FIG. 1.

The process is initiated with step S10 that is implemented to insert the arm portions 62 of the coil segments 60, which are combined to one another to cooperate to have the annular shape, into the slots 22, from a side of the above-described other axial end face 20b of the stator core 20, whereby the distal end portions 64 of the respective arm portions 62 of the coil segments 60 are caused to protrude from the axial end face 20a of the stator core 20. Step S10 is followed by step S20 at which the distal end portions 64 of the respective arm portions 62 of the coil segments 60 protruding from the axial end face 20a are bent in the circumferential direction. Step S20 is followed by step S30 at which the distal end portions 64 of the respective arm portions 62 of the coil segments 60 are welded to one another, whereby the coil 50 wound on the tooth portions 24 is formed. The process is completed with step S30 being completed.

In the present embodiment, the coil segments 60 include the distal end portions 64 outwardly protruding from the axial end face 20a of the stator core 20 in the direction of the axis CL, and the coil 50 includes the welded portions 68 each of which is constituted by the distal end portions 64 that are welded to each other, wherein the welded portions 68 include the plurality of kinds of welded portions 68 that are different from each other in terms of the welded position, i.e., the position in which the distal end portions 64 are welded to each other, such that the plurality of kinds of welded portions 68 are arranged in the circumferential direction of the stator core 20. Further, the plurality of kinds of welded portions 68 consist of the first, second, third and fourth welded portions 68a, 68b, 68c, 68d such that each pair of the welded portions 68, which are adjacent to each other in the circumferential direction, consist of two of the four kinds of welded portions 68a, 68b, 68c, 68d. Owing to this arrangement, the annular rigidity of the coil 50 is not uniform in the circumferential direction, in contrast with an arrangement in which the welded portions 68 consist of the same kind of welded portions 68 in the circumferential direction. Since the annular rigidity of the coil 50 is not uniform, the annular rigidity of the stator 10 is also not uniform so that it is possible to suppress resonance of the stator 10. The resonance of the stator 10 includes, for example, resonance in the circumferential direction, resonance in the radial direction, resonance caused by twisting between a portion of the stator 10 (which is located on a side of the above-described axial end face 20a) and another portion of the stator 10 (which is located on a side of the above-described other axial end face 20b), and resonance caused by deviation of the above-described portion of the stator 10 from the axis CL in a case in which the above-described other portion of the stator 10 is fixed to a non-rotary member while the above-described portion of the stator 10 is not fixed to the non-rotary member.

Second Embodiment

Figure 6:
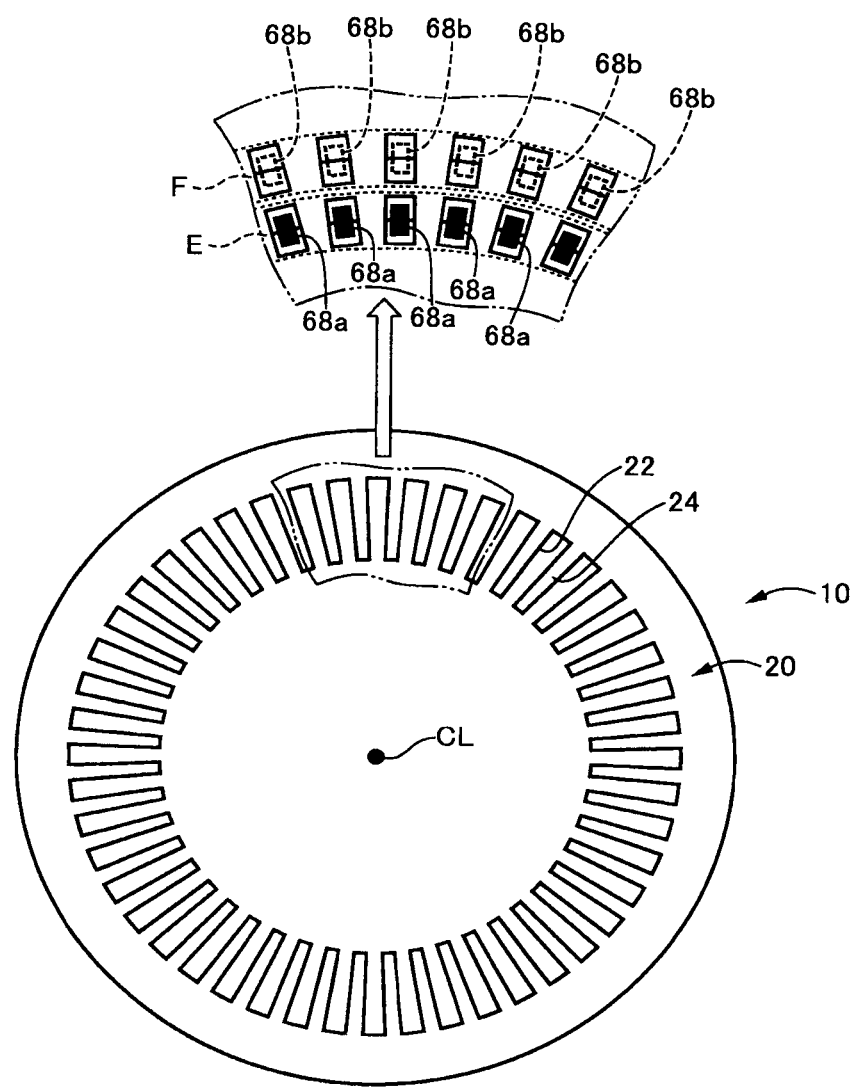
FIG. 6 is a schematic view of arrangement of the plurality of welded portions of the coil wound on the stator core in a second embodiment of the present invention, as viewed in the axial direction.

FIG. 6 is a schematic view of arrangement of the plurality of welded portions 68 of the coil 50 wound on the stator core 20 of the rotary electric machine MG according to a second embodiment of the present invention, as viewed in the direction of the axis CL. The view of FIG. 6 corresponds to the view of FIG. 4 that shows the above-described first embodiment. This second embodiment is substantially the same as the first embodiment in the construction of the stator 10 and the manner of winding of the coil 50, but is different from the first embodiment in arrangement of the welded portions 68.

As shown in FIG. 6, a region E is located in an inner-peripheral side portion of the stator core 20 while a regions F is located in an outer-peripheral side portion of the stator core 20. That is, the region E is located on an inner side of the region F in the radial direction. The welded portions 68 located in the region E are the first welded portions 68a that are arranged in the circumferential direction. The welded portions 68 located in the region F are the second welded portions 68b that are arranged in the circumferential direction.

In this second embodiment, the coil segments 60 include the distal end portions 64 outwardly protruding from the axial end face 20a of the stator core 20 in the direction of the axis CL, and the coil 50 includes the welded portions 68 each of which is constituted by the distal end portions 64 that are welded to each other, wherein the welded portions 68 include the plurality of kinds of welded portions 68 that are different from each other in terms of the welded position, such that the plurality of kinds of welded portions 68 are arranged in the radial direction of the stator core 20. Further, the plurality of kinds of welded portions 68 consist of the first and second welded portions 68a, 68b such that each pair of the welded portions 68, which are adjacent to each other in the radial direction, consist of the two kinds of welded portions 68a, 68b. Owing to this arrangement, the annular rigidity of the coil 50 is not uniform in the radial direction, in contrast with an arrangement in which the welded portions 68 consist of the same kind of welded portions 68 in the radial direction. Since the annular rigidity of the coil 50 is not uniform, the annular rigidity of the stator 10 is also not uniform so that it is possible to suppress resonance of the stator 10.

Third Embodiment

Figure 7:
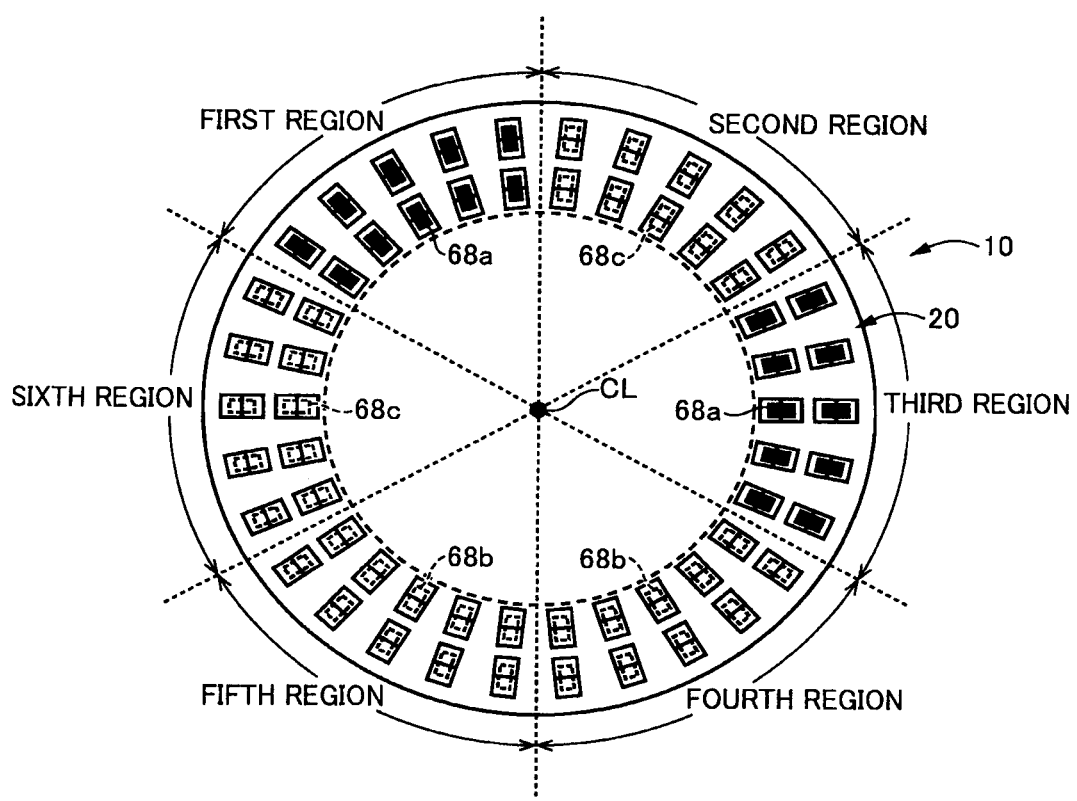
FIG. 7 is a schematic view of arrangement of the plurality of welded portions of the coil wound on the stator core in a third embodiment of the present invention, as viewed in the axial direction.

FIG. 7 is a schematic view of arrangement of the plurality of welded portions 68 of the coil 50 wound on the stator core 20 of the rotary electric machine MG according to a third embodiment of the present invention, as viewed in the direction of the axis CL. The view of FIG. 7 corresponds to the view of FIG. 4 that shows the above-described first embodiment. This third embodiment is substantially the same as the first embodiment in the construction of the stator 10 and the manner of winding of the coil 50, but is different from the first embodiment in arrangement of the welded portions 68.

In the above-described first embodiment, each adjacent four of the welded portions 68, which are adjacent to one another in the circumferential direction, consist of the first, second, third and fourth welded portions 68a, 68b, 68c, 68d. In this third embodiment, the plurality of kinds of welded portions 68 are arranged in the circumferential direction, such that each pair of the welded portions 68, which are located in respective positions symmetrical to each other with respect to the axis CL, consist of two of the kinds of welded portions 68. More specifically, the coil 50 is divided into first through six regions at equal angular intervals of $2\pi/6$[rad] around the axis CL, such that the first and second welded portions 68a, 68b as the two kinds of welded portions 68 are located in the respective first and fourth regions that are located in respective positions symmetrical to each other with respect to the axis CL, such that the third and second welded portions 68c, 68b as the two kinds of welded portions 68 are located in the respective second and fifth regions that are located in respective positions symmetrical to each other with respect to the axis CL, and such that the first and third welded portions 68a, 68c as the two kinds of welded portions 68 are located in the respective third and sixth regions that are located in respective positions symmetrical to each other with respect to the axis CL.

In this third embodiment, the coil 50 includes the welded portions 68 each of which is constituted by the distal end portions 64 that are welded to each other, wherein the welded portions 68 include the plurality of kinds of welded portions 68 that are different from each other in terms of the welded position, such that the plurality of kinds of welded portions 68 are arranged in the circumferential direction of the stator core 20. Further, the plurality of kinds of welded portions 68 consist of the first, second and third welded portions 68a, 68b, 68c such that each pair of the welded portions 68, which are located in the respective positions symmetrical to each other with respect to the axis CL, consist of two of the three kinds of welded portions 68a, 68b, 68c which are different from each other in the welded position. Owing to this arrangement, the annular rigidity of the coil 50 is not uniform between the positions symmetrical to each other with respect to the axis CL, in contrast with an arrangement in which each pair of the welded portions, which are located in the respective positions symmetrical to each other with respect to the axis CL, do not consist of two of the three kinds of welded portions 68a, 68b, 68c. Since the annular rigidity of the coil 50 is not uniform, the annular rigidity of the stator 10 is also not uniform so that it is possible to suppress the resonance of the stator 10.

While the preferred embodiments of this invention have been described in detail by reference to the drawings, it is to be understood that the invention may be otherwise embodied.

In the above-described first embodiment, each adjacent four of the welded portions 68, which are adjacent to one another in the circumferential direction, consist of the first, second, third and fourth welded portions 68a, 68b, 68c, 68d, such that each pair of the welded portions 68, which are adjacent to each other in the circumferential direction, consist of two of the four kinds of welded portions 68. However, this arrangement is not essential for the present invention. For example, the first, second, third and fourth welded portions 68a, 68b, 68c, 68d as the four kinds of welded portions 68 may be randomly arranged in the circumferential direction, and some circumferentially adjacent pairs of the welded portions 68 may consist of the same kind of welded portions 68, as long as two or more kinds of welded portions 68 are arranged in the circumferential direction so that the annular rigidity of the coil 50 is not uniform in contrast with an arrangement in which the same kind of welded portions are arranged in the circumferential direction.

In the above-described second embodiment, each adjacent pair of the welded portions 68, which are adjacent to each other in the radial direction, consist of the first and second welded portions 68a, 68b, so that each pair of the welded portions 68, which are adjacent to each other in the radial direction, consist of the two kinds of welded portions 68. However, this arrangement is not essential for the present invention. For example, the first and second welded portions 68a, 68b as the two kinds of welded portions 68 may be randomly arranged in the radial direction, and some radially adjacent pairs of the welded portions 68 may consist of the same kind of welded portions 68, as long as the annular rigidity of the coil 50 is not uniform, in contrast with an arrangement in which the same kind of welded portions are arranged in the radial direction. Further, three or more kinds of welded portions 68 may be arranged in the radial direction.

In the above-described third embodiments, the three kinds of welded portions 68 are arranged in the circumferential direction, such that each pair of the welded portions 68, which are located in respective positions symmetrical to each other with respect to the axis CL, consist of two of the three kinds of welded portions 68. However, two or more than three kinds of welded portions 68 may be arranged in the circumferential direction, as long as each pair of the welded portions 68, which are located in respective positions symmetrical to each other with respect to the axis CL, consist of two kinds of welded portions 68.

In the above-described first through third embodiments, the plurality of kinds of welded portions 68 are different from each other in the welded position, namely, in the distance of the welded position from the axial end face 20a of the stator core 20 in the direction of the axis CL. However, this is not essential for the invention. For example, the plurality of kinds of welded portions 68 are different from each other in a welded size or dimension, i.e., a dimension over which the distal end portions 64 are welded to each other. The size or dimension can be changed by changing a time for which the arc is applied to the applied part of the distal end portion 64 from the electrode rod in the TIG welding. Further, the plurality of kinds of welded portions 68 may be different from each other in a combination of the welded position and size. That is, the plurality of kinds of welded portions 68 may be different from each other in at least one of the welded position and the welded size. It is noted that the welded size or dimension corresponds to "welded manner (in which the segment end portions are welded to each other)" and "dimension (over which the segment end portions are welded to each other)".

In the above-described first embodiment, the plurality of kinds of welded portions 68 are arranged in the circumferential direction. In the above-described second embodiment, the plurality of kinds of welded portions 68 are arranged in the radial direction. However, the plurality of kinds of welded portions 68 may be arranged also in both the circumferential direction and radial direction. That is, it is sufficient that the plurality of kinds of welded portions 68 are arranged in at least one of the circumferential direction and the radial direction.

In the above-described first through third embodiments, each of the welded portions 68 is made by the TIG welding. However, each of the welded portions 68 may be made in any of other welding manners such as (i) seam welding that is performed by resistance heat applied to a part (that is to be welded) while the applied part is held down by an electrode and (ii) laser welding that is performed by heating a part (that is to be welded) by applying laser to the part. In the seam welding, the welded position can be changed by changing a position of the part to which an electric current is applied, and the welded size can be changed by changing an amount of the applied electric current and/or a time for which the electric current is applied. In the laser welding, the welded position can be changed by changing a position of the part to which the laser is applied, and the welded size can be changed by changing a spot size of the applied laser and/or a time for which the laser is applied.

In the above-described first through third embodiments, the coil 50 is wound in the distributed winding. However, the present invention is applicable also to the stator 10 in which the coil 50 is wound in a concentrated winding.

In the above-described first through third embodiments, the rotary electric machine MG is the motor generator serving as the drive power source for driving the vehicle. However, the rotary electric machine MG does not necessarily have to be the motor generator, but may be, for example, an electric motor having only a function of driving the vehicle without having a function of generating the electric power, or an electric power generator having only the function of generating the electric power without having the function of driving the vehicle.

It is to be understood that the embodiments described above are given for illustrative purpose only, and that the present invention may be embodied with various modifications and improvements which may occur to those skilled in the art.

NOMENCLATURE OF ELEMENTS

10: stator
20: stator core
20*a*: axial end face
22: slot
50: coil
60: coil segment
64: distal end portion (segment end portion)
68: welded portions
CL: axis
MG: rotary electric machine

What is claimed is:

1. A stator for a rotary electric machine, the stator comprising:
    a tubular stator core; and
    a coil including coil segments inserted in slots of the stator core;
    wherein the coil segments include segment end portions outwardly protruding from an axial end face of the stator core,
    wherein the coil includes welded portions each of which is constituted by the segment end portions that are welded to each other,
    wherein the welded portions include a plurality of kinds of welded portions that are different from each other in a welded manner in which the segment end portions are welded to each other, such that the plurality of kinds of welded portions are arranged in at least one of a circumferential direction of the stator core and a radial direction of the stator core,
    wherein the plurality of kinds of welded portions are arranged in the circumferential direction of the stator core, and
    wherein each pair of the welded portions, which are located in respective positions symmetrical to each other with respect to an axis of the tubular stator core, consist of two of the kinds of welded portions, which are different from each other in the welded manner.

2. The stator according to claim 1,
    wherein the plurality of kinds of welded portions are different from each other in at least one of (i) a position in which the segment end portions are welded to each other and (ii) a dimension over which the segment end portions are welded to each other.

3. The stator according to claim 1,
    wherein the plurality of kinds of welded portions are arranged in the circumferential direction of the stator core, and
    wherein each pair of the welded portions, which are adjacent to each other in the circumferential direction, consist of two of the kinds of welded portions, which are different from each other in the welded manner.

4. The stator according to claim 1,
    wherein the plurality of kinds of welded portions are arranged in the radial direction of the stator core, and
    wherein each pair of the welded portions, which are adjacent to each other in the radial direction, consist of two of the kinds of welded portions, which are different from each other in the welded manner.

* * * * *